United States Patent [19]

Bauer et al.

[11] Patent Number: 5,624,988
[45] Date of Patent: Apr. 29, 1997

[54] PROCESS FOR THE PRODUCTION OF POLYMER-BOUND RUBBER CHEMICALS

[75] Inventors: Armin Bauer, Brühl; Hans-Joachim Graf, Mannheim; Anton Hartmayer, Neulussheim; Harald Kleinknecht, Alzey; Rene Loix, Leimen; Arthur Relle, Ketsch; Volker Schäfer, Altrip, all of Germany

[73] Assignee: Rhein Chemie Rheinau GmbH

[21] Appl. No.: 409,904

[22] Filed: Mar. 23, 1995

Related U.S. Application Data

[62] Division of Ser. No. 239,962, May 9, 1994, abandoned.

[30] Foreign Application Priority Data

May 17, 1993 [DE] Germany ............... 43 16 429.3

[51] Int. Cl.$^6$ ................ C08K 3/06; C08K 5/47
[52] U.S. Cl. ............. 524/303; 252/182.13; 524/577; 524/590; 524/599; 525/343; 525/349; 525/354
[58] Field of Search ................ 252/182.13; 524/303, 524/577, 590, 599; 525/354

[56] References Cited

U.S. PATENT DOCUMENTS

| | | | |
|---|---|---|---|
| 1,865,728 | 7/1932 | Sibley | 525/349 |
| 2,450,771 | 10/1948 | Vaughan | 525/349 |
| 2,454,862 | 11/1948 | Collins | 524/303 |
| 2,609,373 | 9/1952 | Beaver | 525/349 |
| 3,635,859 | 1/1972 | Passalenti | 528/274 |
| 3,920,623 | 11/1975 | Khan | 528/389 |
| 4,190,460 | 2/1980 | Cassar | 528/389 |
| 4,524,182 | 6/1985 | Bauer | 528/491 |

FOREIGN PATENT DOCUMENTS

| | | |
|---|---|---|
| 2901774 | 7/1980 | Germany . |
| 3307421 | 9/1984 | Germany . |
| 3920411 | 3/1991 | Germany . |
| 4231073 | 3/1994 | Germany . |

*Primary Examiner*—Christopher Henderson
*Attorney, Agent, or Firm*—Connolly & Hutz

[57] ABSTRACT

Process for the production of polymer-bound rubber chemicals, characterized in that the rubber chemicals and optionally additives are finely dispersed in a low molecular weight polymerizable liquid, polymerization is then initiated, optionally after adding a further component which reacts with the polymerizable liquid to form a polymer, and the solid, homogeneous mixture of rubber chemicals and polymer so formed is optionally converted into a form suitable for use.

6 Claims, No Drawings

PROCESS FOR THE PRODUCTION OF POLYMER-BOUND RUBBER CHEMICALS

This is a division of Ser. No. 239,962, filed May 9, 1994, now abandoned.

FIELD OF THE INVENTION

The invention relates to production of rubber chemicals in polymer-bound form.

BACKGROUND AND PRIOR ART

Rubber chemicals are taken in this document to be substances which are added to rubber compounds to allow vulcanisation to occur, to control the course of vulcanisation and to influence the properties of the vulcanisates. Rubber chemicals are usually powders which may not be readily incorporated homogeneously into rubber compounds and usually give rise to dust during processing. Rubber chemicals are therefore often used in bound, dustless form in order to avoid dust problems, to accelerate incorporation and to improve the homogeneity of the compound.

It has proved particularly favourable to use rubber chemicals in rubber-bound form as master batches. Suitable binders are EPDM rubber, ethylene/vinyl acetate copolymer rubber or mixtures of the two. These master batches, which are often in pellet form, frequently contain plasticisers and dispersion auxiliaries in addition to rubber chemicals and rubber.

Another type of bound rubber chemicals uses factice or similar materials, for example epoxidised triglycerides crosslinked with dicarboxylic acids (German patent application P 39 20 411), as binder.

In order to produce these master batches from rubber chemicals, optionally auxiliary substances and the polymeric binders, it is necessary to perform mixing in customary mixing equipment, for example closed mixers, extruders or rollers, and then to convert them into a form suitable for use, for example pellets. The mechanical mixing processes do not guarantee complete homogeneity, particularly since the rubber chemicals have a tendency to reagglomerate.

SUMMARY OF THE INVENTION

The invention is based on the finding that it is possible to produce polymer-bound rubber chemicals more easily, with lower energy consumption and better homogeneity if the polymer is produced in the presence of the already finely dispersed rubber chemicals.

The present invention therefore provides a process for the production of polymer-bound rubber chemicals, which is characterised in that the rubber chemicals and optionally additives such as plasticisers are finely dispersed in a low molecular weight polymerisable liquid, polymerisation is then initiated, optionally after adding a further component which reacts with the polymerisable liquid to form a polymer, and the solid, homogeneous mixture of rubber chemicals and polymer so formed is optionally converted into a pourable form.

DESCRIPTION OF PREFERRED EMBODIMENTS

Rubber chemicals pursuant to this invention are for example vulcanisation accelerators such as inter alia tetramethyl thiuram disulphide (TMTD), dibenzothiazyl disulphide (MTBS), N-cyclohexyl-2-benzothiazyl sulphenamide (CBS), zinc benzyl dithiocarbamate (ZBEC), vulcanising agents such as inter alia sulphur (S), dimorpholine disulphide (DTDM), caprolactam disulphide, activators such as inter alia zinc oxide, magnesium oxide, lead oxides together with other additives used in rubber compounds such as inter alia retarders, stabilisers, antioxidants, fillers, processing auxiliaries.

There are several possibilities for "in situ" formation of the rubber chemical binder. The rubber chemicals may for example be dispersed in a liquid monomer such as styrene and polymerisation of this monomer may then be initiated in a customary manner, for example with catalysts or thermally. Any known polymerisation process may be used for this purpose, provided that it starts from a liquid monomer and that the polymer obtained is compatible with rubber.

Another possibility consists in dispersing the rubber chemicals in a liquid which constitutes one component of a polymerisable system consisting of at least two components and then adding the second component.

An example of this approach is to disperse the rubber chemicals in epoxidised fatty acids or fatty acid esters such as triglycerides and then to form a polymer with a polybasic acid such as for example dicarboxylic acid or phosphoric acid or phosphoric acid partial ester. Such systems are described in more detail in the prior German patent applications P 33 07 421 and P 42 31 073.

German application 33 07 421 (see U.S. Pat. No. 4,524, 182) discloses the use of epoxidized and subsequently cross-linked esters of at least dihydric, preferably at least trihydric, alcohols and unsaturated fatty acids, in particular, natural triglycerides of unsaturated fatty acids. The epoxidized and subsequently cross-linked esters are obtained by first epoxidizing them and then cross-linking them with suitable polyfunctional cross-linking agents which are reactive with epoxide groups, such as polycarboxylic acids, polyamines, polyhydroxyl compounds or polythiol compounds. Succinic acid, phthalic acid, terephthalic and isophthalic acids and trimellitic acid are examples of suitable di- and higher poly-carboxylic acids. Examples of suitable polyamines include ethylene diamine, diethylene triamine, hexamethylene diamine and phenylene diamines. Examples of suitable polyhydroxyl compounds include glycerol, glycol, diglycol, pentaerythritol, hydroquinone, pyrogallol and hydroxycarboxylic acids esterified with polyhydric alcohols. Suitable polythiol compounds are, for example, ethane-1,2-thiol, trimethylolpropane-tri-3-mercaptopropionate, pentaerythritol-tetra-3-mercaptopropionate and dithiophosphoric acids. Suitable cross-linking agents may also contain several functional groups in one molecule. Suitable alcohols, which are at least dihydric, preferably trihydric, are for example, glycerol, glycol, pentaerythritol, trimethylol-propane and/or sorbitol. Among the esters, the natural triglycerides of unsaturated fatty acids, so-called "fatty oils", for example rapeseed oil, linseed oil, soya bean oil and fish oil, are preferred. When dihydric alcohols are used, the cross-linking agents are preferably at least trifunctional.

The cross-linking agents are reacted with the epoxidized fatty oils, which may have epoxide contents of from 1.5 to 15% by weight, (percent, by weight, of oxygen based on the epoxidized fatty oil), preferably from 4 to 8%, by weight, generally in amounts of from 3 to 50% by weight, generally at temperatures of from 80° to 180° C., preferably from 100° to 150° C., the products obtained being solid or semi-solid polymers.

The quantity of cross-linking agent added is calculated to provide about one cross-linkable group of cross-linking agent per epoxide group.

If the reaction is not completely stoichiometric, the cross-linking product should preferably still contain epoxide groups.

Dicarboxylic acids are preferred cross-linking agents.

German Application 33 07 421 also discloses the production of the cross-linked products by a one-shot process, in which the fatty oils, after having been epoxidized with suitable per-acids, such as peracetic acid or performic acid, are dehydrated by the passage there-through of a stream of gas, such as air or nitrogen, in the presence of from 0.5 to 5%, by weight, based on the quantity of ester of basic oxides, such as calcium oxide, magnesium oxide, or other suitable acid-binding agents, at temperatures of from 100° to 120° C. This may be directly followed by the reaction with poly-functional cross-linking agents without a loss in the quality of the cross-linked products. The presence in the polymers of the basic oxides or the neutralization products thereof with the acids contained in the mixture in many cases does not interfere with the use of the polymers.

German application 42 31 073, published Mar. 24, 1994, discloses a process for the phosphorylation of epoxidized fatty acids, e.g. oleic acids, linoleic acids, erucic acids and fatty acid derivatives such as fatty acid esters, e.g. colza oil, soya bean oil or oleic acid methyl ester, characterized in that an epoxidized fatty acid or a derivative thereof having an epoxide content of from 1.5–15% by weight, preferably from 4–8% by weight, is reacted with the phosphoric acid or its ester at 0°–120° C., preferably at 20°–80° C., most preferably at about 40° C. The quantity of phosphoric acid or its ester is calculated to provide about one equivalent of phosphoric acid for each epoxide group. Epoxidized fatty acids and fatty acid derivatives, e.g. fatty acid esters, are in particular epoxidation products of fatty acid glycerides or of their alkyl esters (in particular methyl ester), e.g. of colza oil, soya bean oil, lard oil, etc. having an epoxide content of from 3–10% by weight. They may be used singly or as mixtures. Examples of such mixtures are epoxidized colza oil/epoxidized colza oleic acid methyl ester and epoxidized soya bean oil/epoxidized colza oleic acid methyl ester. Epoxidized fatty acid esters may also be phosphorylated together with epoxidized hydrocarbons (straight chain or branched) or with epoxidized ether compounds preferably having 6–10 carbon atoms. An example of such compounds is 1-(2-ethyl-hexyloxy)-2,3-epoxypropane/epoxidized soya bean oil. Phosphoric acid or mono- and diesters of phosphoric acid may be used for phosphorylation. Mono- and dialkylesters having straight chain or branched alkyl groups with a chain length of preferably 4–10 carbon atoms and mono- and diarylesters are particularly suitable.

Using the same principle, the rubber chemicals may be dispersed in polyether polyol/polyester polyol and the polymer produced with polyfunctional isocyanate. These systems have long been well known in polyurethane chemistry.

EXAMPLES

Example 1

48 parts by weight of MBTS (mercaptobenzothiazyl disulphide) powder are stirred using a dissolver into a mixture consisting of 40 parts by weight of oxidised soya oil (Edenol DS1, Henkel KGaA) and 8 parts by weight of a mixture of thiocarboxylic and carboxylic acid esters (Vulkanol 81, Bayer AG). 5 parts by weight of phosphoric acid partial ester (Additin C8/100, Rhein-Chemie) are stirred, optionally while cooling, into the liquid mixture so obtained; after 10 minutes a further 1 part by weight of phosphoric acid (85%) is added. The temperature of the mixture rises to approximately 55° C. After approximately 5 minutes, a polymeric, plastic, crumbly product is produced with a Shore 0 hardness of 50 to 60.

Example 2

50 parts by weight of ground sulphur powder are homogeneously stirred using a dissolver into 48 parts by weight of epoxidised soya oil (epoxy oxygen 6.0–6.3%, Edenol D81, Henkel KGaA).

2 parts by weight of phosphoric acid (85%) are stirred, optionally while cooling, into the high viscosity mixture produced. After approximately 5 minutes, a polymeric, plastic, crumbly product has formed with a Shore 0 hardness of 50 to 60.

Example 3

51 parts by weight of MBTS (mercaptobenzothiazyl disulphide) powder are stirred using a dissolver into a mixture of 23 parts by weight of castor oil (OH value 165), 2 parts by weight of polyalcohol (OH value 250, Desmodur TM, Bayer AG), 20 parts by weight of dioctyladipic acid ester and 6 parts by weight of methylenebisdiphenyl diisocyanate.

Once a homogeneous mixture has been produced, 0.06 parts by weight of dibutyltin diacetate are added. After 2 to 4 hours, a polymeric, plastic, crumbly product is obtained. Shore 0 hardness is 35 to 45.

We claim:

1. A process for preparing powder-form rubber vulcanization additives into polymer-bound form, which comprises finely dispersing the powder-form rubber vulcanization additive in a polymerizable liquid, initiating polymerization of the polymerizable liquid to form a polymer, and converting the polymer containing the rubber vulcanization additive bound therein into a pourable form, wherein the polymerizable liquid comprises an epoxidized fatty acid or fatty acid ester and polymerization is initiated by the addition of a polybasic acid.

2. A process as claimed in claim 1, wherein the rubber vulcanization additive is selected from the group consisting of tetramethyl thiuram disulphide, dibenzothiazyl disulphide, N-cyclohexyl-2-benzothiazyl sulphenamide, zinc benzyl dithiocarbamate, sulfur, dimorpholine disulphide, caprolactam disulphide, zinc oxide, magnesium oxide, and lead oxide.

3. A process as claimed in claim 1, wherein a retarder, stabilizer, antioxidant, filler, or processing auxiliary is added before initiation of polymerization.

4. A process as claimed in claim 1, wherein the rubber vulcanization additive is mercaptobenzothiazyl disulphide, and the polymerizable liquid comprises an epoxidized soya oil and a mixture of thiocarboxylic and carboxylic acid esters, and polymerization is initiated by addition of phosphoric acid partial ester and further addition of phosphoric acid.

5. A process for preparing powder-form rubber vulcanization additives into polymer-bound form, which comprises finely dispersing the powder-form rubber vulcanization additive in a polymerizable liquid, initiating polymerization of the polymerizable liquid to form a polymer, and converting the polymer containing the rubber vulcanization additive bound therein into a pourable form, wherein the polymerizable liquid comprises a polyether polyol or polyester polyol and polymerization is initiated by the addition of a polyfunctional isocyanate.

6. A process as claimed in claim 5, wherein the rubber vulcanization additive is selected from the group consisting of tertramethyl thiuram disulphide, dibenzothiazyl disulphide, N-cyclohexyl-2-benzothiazyl sulphenamide, zinc benzyl dithiocarbamate, sulfur, dimorpholine disulphide, caprolactam disulphide, zinc oxide, magnesium oxide, and lead oxide.

* * * * *